(12) United States Patent
Shahamad et al.

(10) Patent No.: US 11,049,383 B1
(45) Date of Patent: Jun. 29, 2021

(54) METHOD FOR PROTECTION OF CHILDREN, SENIORS AND PETS FROM VEHICULAR HEATSTROKE IN HOT VEHICLES

(71) Applicants: Aidan Lee Shahamad, Boynton Beach, FL (US); Anand Peter Shahamad, Boynton Beach, FL (US); Coleen Lee Shahamad, Boynton Beach, FL (US)

(72) Inventors: Aidan Lee Shahamad, Boynton Beach, FL (US); Anand Peter Shahamad, Boynton Beach, FL (US); Coleen Lee Shahamad, Boynton Beach, FL (US)

( * ) Notice: Subject to any disclaimer, the term of this patent is extended or adjusted under 35 U.S.C. 154(b) by 0 days.

(21) Appl. No.: 16/542,377

(22) Filed: Aug. 16, 2019

Related U.S. Application Data

(60) Provisional application No. 62/726,490, filed on Sep. 4, 2018.

(51) Int. Cl.
| | |
|---|---|
| *G08B 25/01* | (2006.01) |
| *B60W 10/30* | (2006.01) |
| *G08B 21/22* | (2006.01) |
| *H04L 29/08* | (2006.01) |
| *G06F 9/54* | (2006.01) |

(52) U.S. Cl.
CPC ........... *G08B 25/016* (2013.01); *B60W 10/30* (2013.01); *G06F 9/542* (2013.01); *G08B 21/22* (2013.01); *H04L 67/26* (2013.01)

(58) Field of Classification Search
CPC ..... G08B 25/016; G08B 21/22; B60W 10/30; B60W 50/14; G06F 9/542; H04L 67/12; H04L 67/26; G08G 1/096725; B60K 35/00; G01C 21/3667
See application file for complete search history.

(56) References Cited

U.S. PATENT DOCUMENTS

| | | | |
|---|---|---|---|
| 9,809,159 B1 * | 11/2017 | Snyder | G06N 20/00 |
| 9,841,767 B1 * | 12/2017 | Hayward | G01C 21/3691 |
| 9,842,496 B1 * | 12/2017 | Hayward | G08G 1/0125 |
| 10,055,985 B1 * | 8/2018 | Hayward | G08G 1/0125 |
| 10,112,530 B1 * | 10/2018 | Snyder | G06N 20/00 |
| 10,216,194 B1 * | 2/2019 | Hayward | B60W 40/10 |
| 10,317,223 B1 * | 6/2019 | Hayward | G08G 1/166 |

(Continued)

*Primary Examiner* — Orlando Bousono
(74) *Attorney, Agent, or Firm* — Bardmesser Law Group

(57) ABSTRACT

A system functions as a safeguard against vehicular heat-related deaths (heatstroke-hyperthermia) or injuries, as well as providing for theft security in vehicles. This system will incorporate a combination of hardware and software components locally within the vehicle and externally 'Cloud' based. At the vehicular level, the hardware involves sensors to detect various pertinent data which in turn is fed into an Electronic Control Unit (ECU). Here the data is collected, processed and stored locally. The software includes algorithms that interact from the ECU to the Cloud server and subsequently to various Internet of Things devices. If certain set thresholds are met upon data analysis at the ECU, this triggers an 'event' and packets of data is streamed via a network to 'SPOT', the Cloud based component for subsequent lifesaving notifications, or if no network connectivity available then evasive preventative measures are executed by the system ECU locally.

14 Claims, 5 Drawing Sheets

(56) References Cited

U.S. PATENT DOCUMENTS

| | | | | |
|---|---|---|---|---|
| 2014/0306799 A1* | 10/2014 | Ricci | ............... | H04W 4/12 |
| | | | | 340/5.83 |
| 2014/0306826 A1* | 10/2014 | Ricci | ............... | G06Q 10/02 |
| | | | | 340/573.1 |
| 2014/0309805 A1* | 10/2014 | Ricci | ............... | B60R 25/25 |
| | | | | 701/1 |
| 2014/0309847 A1* | 10/2014 | Ricci | ............... | A61B 5/6808 |
| | | | | 701/33.1 |
| 2014/0309852 A1* | 10/2014 | Ricci | ............... | G06Q 30/012 |
| | | | | 701/34.4 |
| 2014/0309853 A1* | 10/2014 | Ricci | ............... | B60R 25/1004 |
| | | | | 701/34.4 |
| 2014/0310186 A1* | 10/2014 | Ricci | ............... | G08G 1/01 |
| | | | | 705/302 |
| 2016/0163133 A1* | 6/2016 | Ricci | ............... | G06K 9/00268 |
| | | | | 701/33.4 |
| 2016/0347213 A1* | 12/2016 | Pretta | ............... | B60Q 1/445 |
| 2017/0053460 A1* | 2/2017 | Hauser | ............... | G07C 5/008 |
| 2017/0066406 A1* | 3/2017 | Ricci | ............... | G06Q 30/0639 |
| 2019/0354629 A1* | 11/2019 | Zavesky | ............... | G06N 3/08 |

* cited by examiner

METHOD FOR PROTECTION OF CHILDREN, SENIORS AND PETS FROM VEHICULAR HEATSTROKE IN HOT VEHICLES

CROSS REFERENCE TO RELATED APPLICATIONS

This application is a non-provisional of U.S. Provisional Patent Application No. 62/726,490, filed on Sep. 4, 2018.

BACKGROUND OF THE INVENTION

Field of the Invention

The present invention is related to vehicle safeguards and used to prevent heat related injuries or death, as well as provide a safety system against vehicle burglaries and stolen vehicles.

Description of the Related Art

Currently, vehicles safety has increased exponentially with modern advances in control systems to the point that vehicles are gaining in autonomy, even now the production of self-driving vehicles. However most of these systems has to do with the vehicle in motion and control of all things mechanical. Sensors have been deployed to assist the electronic control of working components such as engines and transmissions, braking, air bags, cruise control, climate control, lights etc. But not so much sensors in terms of sensing the vehicle occupants, especially in vehicle stationary conditions.

Here is where the invention called SPOT (System Protecting Overheating Treasures) can help fill this void and its implementation can yield lifesaving results. With use of network wire/wireless and Internet technology, various sensors can be employed to collect data on humans and pets presence in the vehicle. If such presence is unaccounted for, then the SPOT system default is a security system. More importantly or significantly however, a parked vehicle in direct or indirect sunlight, is dangerous to its occupants, especially if they are children, seniors or pets. The SPOT system incorporates technology of wire/wireless hardware and software to help mitigate death and injuries from hot vehicles.

SUMMARY OF THE INVENTION

The present invention is related to vehicle safeguards against heat related injuries or death in Hot Vehicles, as well as provide a safety system to ward off theft and burglaries. It is a system of hardware and software in combination with sensors programed to send alerts to registered devices via network connectivity from a cloud based server (SPOT— System Protecting Overheating Treasures). These alerts or push notifications will inform of the presence of occupants in the vehicle and also make aware the threat level once thresholds for temperatures causing heat stroke or hyperthermia is approaching. In one aspect of the invention, without the presence of network connectivity, evasive or preventative measures can be deployed locally to address and mitigate the interior temperature of the hot vehicle immediately.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the embodiments of the present invention, examples of which are illustrated in the accompanying drawings.

The proposed invention utilizes an electronic control unit (ECU) and various sensors to collect and transmit data to the SPOT Cloud Service. If an "event" (safety concern) is developing Spot will generate push notifications to registered IoT devices in order that the user can take necessary actions. Where there is no network connectivity and the "event" is exceeding set thresholds to indicate an impending danger level, then the ECU commands preventive measures locally within the vehicle to alleviate the threat (for example, by lowering the windows, or turning on the air conditioner).

Figure 1:
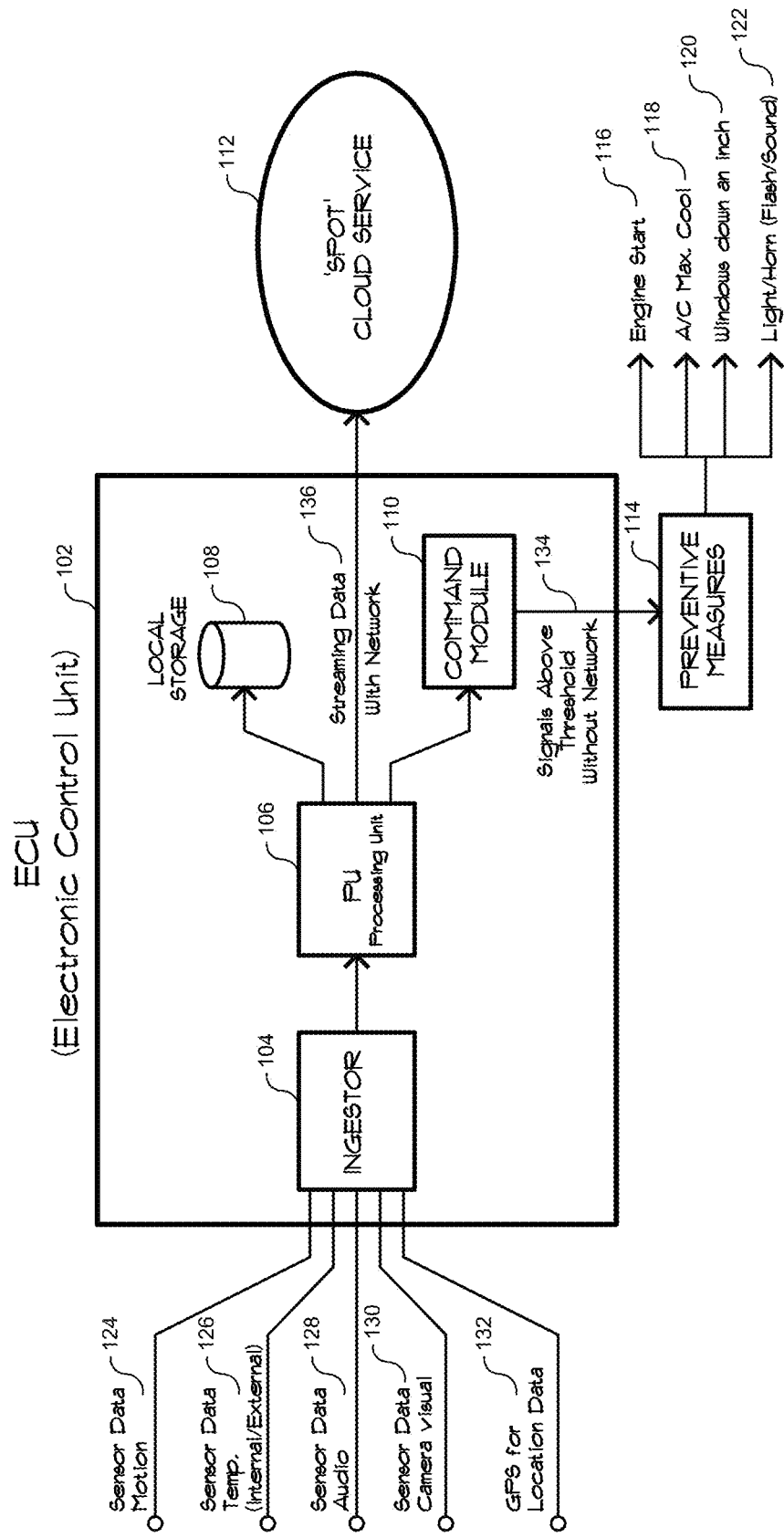
FIG. 1 illustrates the ECU internal components with accompanying input sensors and output to the SPOT (System Protecting Overheating Treasures) cloud server along with preventive measures.

FIG. 1 shows the main components of the proposed system. In FIG. 1 an ECU (electric control unit) 102 performs the function of a local hub thru which data is collected and processed continuously. The ECU 102 receives data gathered from various sensors as shown, which include a motion sensor (Infrared) 124 to detect heat signatures of the moving object vs. the surrounding ambient temp of upholstery etc., an internal temperature sensor of the vehicle 126*i* and external temperature sensor 126*e* (external temperature directly influences the Rate in rise of internal temperature), an audio sensor 128 with calibration to detect human voice range excluding other peripheral noises, a camera for visual observations 130, and a GPS location device 132. The temperature, GPS and audio sensors may be placed anywhere in an unobtrusive but functional location. However, the motion sensor and camera should ideally be located for cross-sampling of data, such as centrally on the middle vehicle axis, for instance at the rearview mirror and then laterally at the B or C pillars for greater data overlapping capability. The sensors may be part of OEM (original equipment manufacturer) in new cars or as an aftermarket safety component. The data received by the ECU 102, enters through the Data Ingestor 104, where it is sorted to be then transmitted on to the Data Processing Unit 106 (also within the ECU). From the Processing Unit 106, the data follows 3 paths. On one path, the data is stored in a local Storage 108 in the ECU and is available for retrieval or simply remains a "vehicle black box" collection point. In the second path, when network connection is present, the Processing Unit streams data 136 and continuously process while streaming to the SPOT Cloud Service 112 which then performs various micro-services that are illustrated/explained further in FIG. 2.

The third data path is to the Command Module 110. Should the data generated exceed certain set thresholds determined by algorithms 134, and the system does not detect network connectivity then the ECU's Command Module 110 will activate predetermined Preventive Measures 114.

These Preventative Measures 114 include an over-ride to impose park and start of the vehicle's engine 116, turning the vehicle's air conditioning on to maximum cool 118 until internal ambient temperature reaches 25° C. (77° F. for example), lowering the windows 120 down an inch or two to relieve and more rapidly equalize interior and exterior temp, and using the vehicle's lights/horn to flash and beep respectively 122 attracting attention of passersby.

Figure 2:
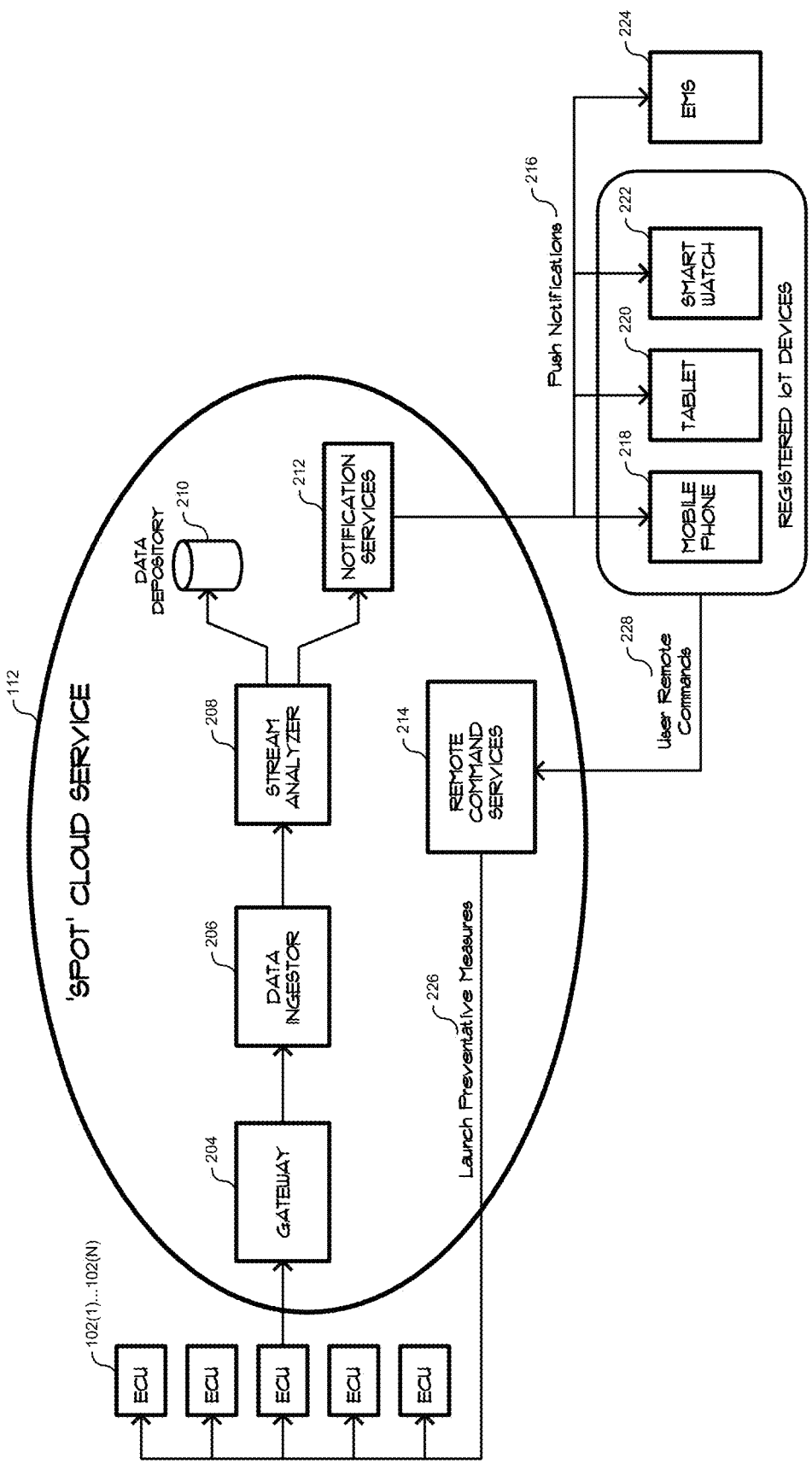
FIG. 2 illustrates the internal components of the SPOT and output to registered devices and how these are looped remotely back to the ECU.

FIG. 2 illustrates what occurs after the data is streamed from the ECUs [102(1) . . . 102(N)] to the SPOT Cloud Service 112. Upon entering the SPOT Cloud Service 112, the data goes through the SPOT Gateway 204 designed for large quantities of streamed data, filtered and sorted then sent into the Data Ingestor 206. The Data Ingestor 206 regulates the flow of data so that it can be fed into the data Stream Analyzer 208 providing analysis as the data streams along for further processing or storage. From the data Stream Analyzer 208, the data is stored in the Data Depository 210 within the SPOT Cloud service 112. If the data exceeds certain thresholds set by the algorithms, notification services 212 in the SPOT Cloud service, will send push notifications 216 to registered Internet of Things (IoT) devices and Emergency Medical Services (EMS) 224 with the GPS location. Some of these registered IoT devices can include mobile phones 218, tablets/laptops 220, and smartwatches 222, etc. Owners of these registered IoT devices can utilize user Remote Commands 228, to activate remote command services 214 (a SPOT Cloud Service), which would launch Preventative Measures 226, in the appropriate ECU [102(1) . . . 102(N)].

Raw data captured from embedded vehicle sensors by the ECU is sent to the cloud server for processing. This data is then sent to the Data Ingestor (206) which will perform data cleansing, consisting primarily of filtering data and anomaly detection.

First aspect of this data cleansing is the function of filtering the data that is received. Upon receipt of the data, the Data Ingestor (206) will ensure the standardization of data to reduce the risk of duplication and ensure it meets data quality standards. The Data Ingestor (206) uses predetermined range constraints in order to ensure the validity of the data received. This step will help prevent false actions by the system triggered by faulty data. For instance, in the case of an interior temperature reading 250 degrees Fahrenheit, this data point will be rejected as it is a sign of faulty data or a malfunctioning sensor. Using statistical algorithms, range constraints will be determined and implemented for each cluster of sensor data (i.e. a set temperature range for the interior and exterior temperatures, a set frequency range for the audio sensor, etc.). After filtering the data from each sensor type, the Data Ingestor (206) also cross-references the data from multiple sensors in order to minimize the occurrence of false actions.

Once data is cleansed this will be followed by anomaly detection. Anomaly detection algorithms monitors time series data from the sensors to ensure that the data is within programmed thresholds. Time series data is sensor data coming from a single vehicle over a period of time (example in intervals of 10 seconds). Anomaly detection algorithms will continuously monitor incoming data to establish a trend which enable it to detect that the data is within range and projected valid data ranges. For instance, if the interior temperature of a car changes from 50 degrees Fahrenheit to 110 degrees Fahrenheit in the span of 30 seconds, then this is exemplary of an anomaly in the data. Even though temperatures from 50 degrees Fahrenheit to 110 degrees Fahrenheit are likely to be within the aforementioned range constraints, a change from 50 to 110 degrees Fahrenheit in a 30 second time span is impractical in a real-world application and thus rendered invalid resulting in rejection of this data.

Once data is determined to be valid, it is then sent to a data stream for the stream analyzer (208) to analyze. This would entail using logic systems to analyze the trend of the data to see if subsequent data points are within reasonable expectations, thus determining if the data set displays falls within projected valid data changes compared to perceived ranges falling outside predetermined sets thus rendering these data invalid. If determined invalid, then this data will be rejected. The Data Ingestor (206) performs a major role in the data cleansing process of data auditing and the system workflow specifications.

The stream analyzer (208) will apply custom algorithms to assist in the decision of the next actions, for instance whether or not preventative measures are to be taken. The stream analyzer cross references the data from each sensor in a vehicle to ensure consistency in the data received which help the predictive analytics and ensures the correct application of preventative measures. By comparing a current data set with time series data sets collected from the vehicle sensors, the stream analyzer (208) uses statistical computations algorithms to create a predictive model based on the time series data. Analyzing the trend of the data across multiple sensors in each vehicle, the stream analyzer (208) will initiate preset selective preventative measures. For instance, if motion is continuously detected in the vehicle and the interior temperature of the vehicle is rising to fatal levels, then the stream analyzer (208) will correlate this data to determine if a certain action or preventative measure is needed. By analyzing this trend, the steam analyzer (208) will initiate preventative measures before any fatality or injury can occur. When preventative measures are deemed necessary, workflow execution will occur, initiating and enacting the push notifications to IoT devices, remote evasive actions, EMS notification and vehicle employed local alerts as delineated in FIG. 3.

Figure 3:
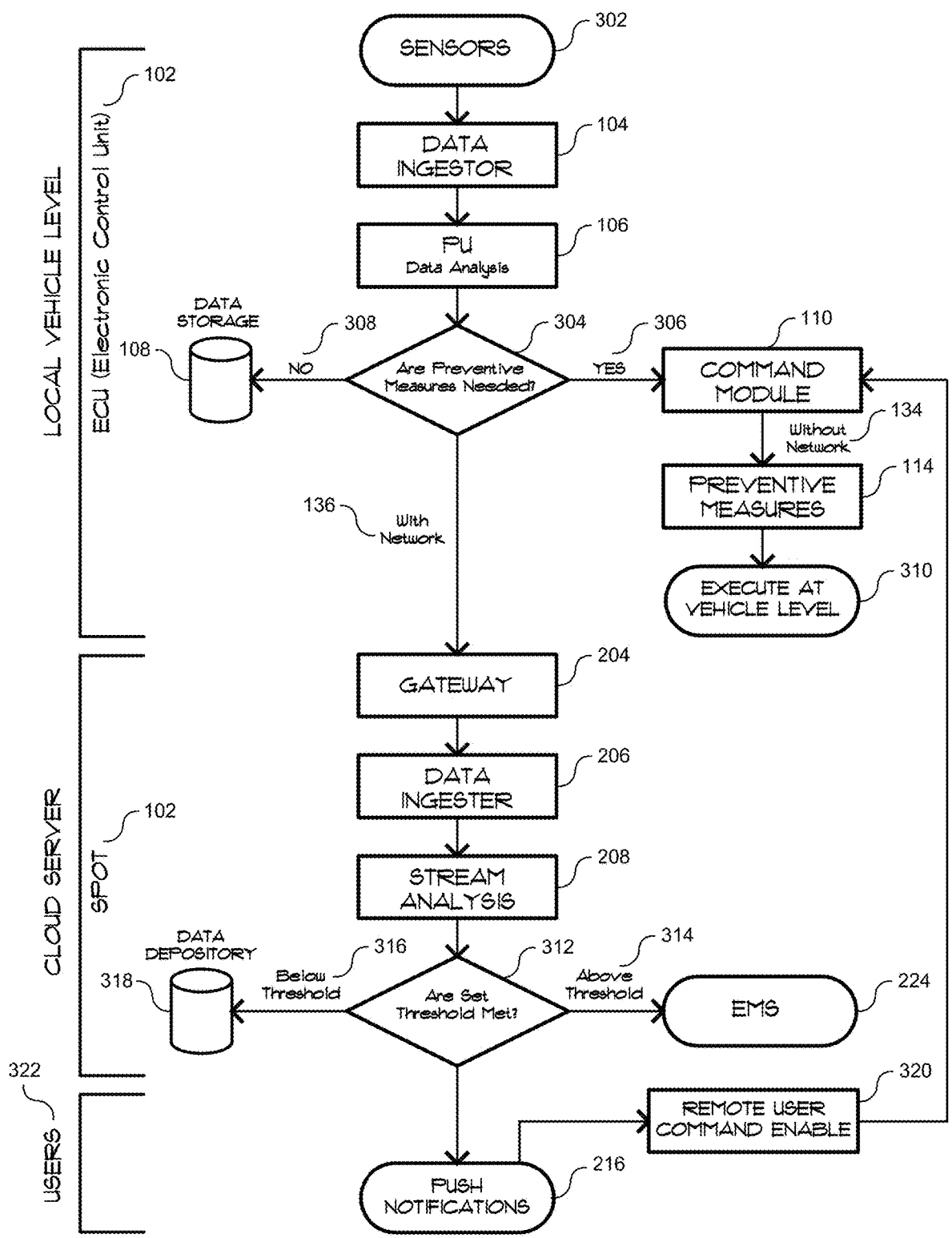
FIG. 3 illustrates a Data flow chart of the system operations.

FIG. 3 illustrates the flow chart of data flow through the various components with measures taken. At the local vehicle level, data is sent from the sensor to the ECU. ECU's Ingestor collects and sorts data, sending to the PU for processing, which determine if thresholds called 'Events' are met thus warranting preventive measures. If not, then data is stored. If yes, meaning threshold are exceeded and there is no network connectivity then the command module would activate preventive measures and execute these safeguards at the local vehicle level. If network connectivity available, data will be streamed to the SPOT cloud server Gateway. Data is collected and sent to the Data Ingestor (206) which files and packages it to be processed by the Stream Analyzer (208). If set thresholds are not met, data is stored in the Data Depository. If set Thresholds are exceeded, then (either additionally or instead of) push notifications are sent to register IoT devices. If thresholds are continually exceeded and rising to dangerous levels, but no user interface response, then EMS notifications will be sent. Push notifications alerts the user to take control and attend to concern in person. If circumstances prevent an in person immediate response, alternatively user can remotely enable preventive measures via the command module at the vehicle for an immediate response.

Figure 4:
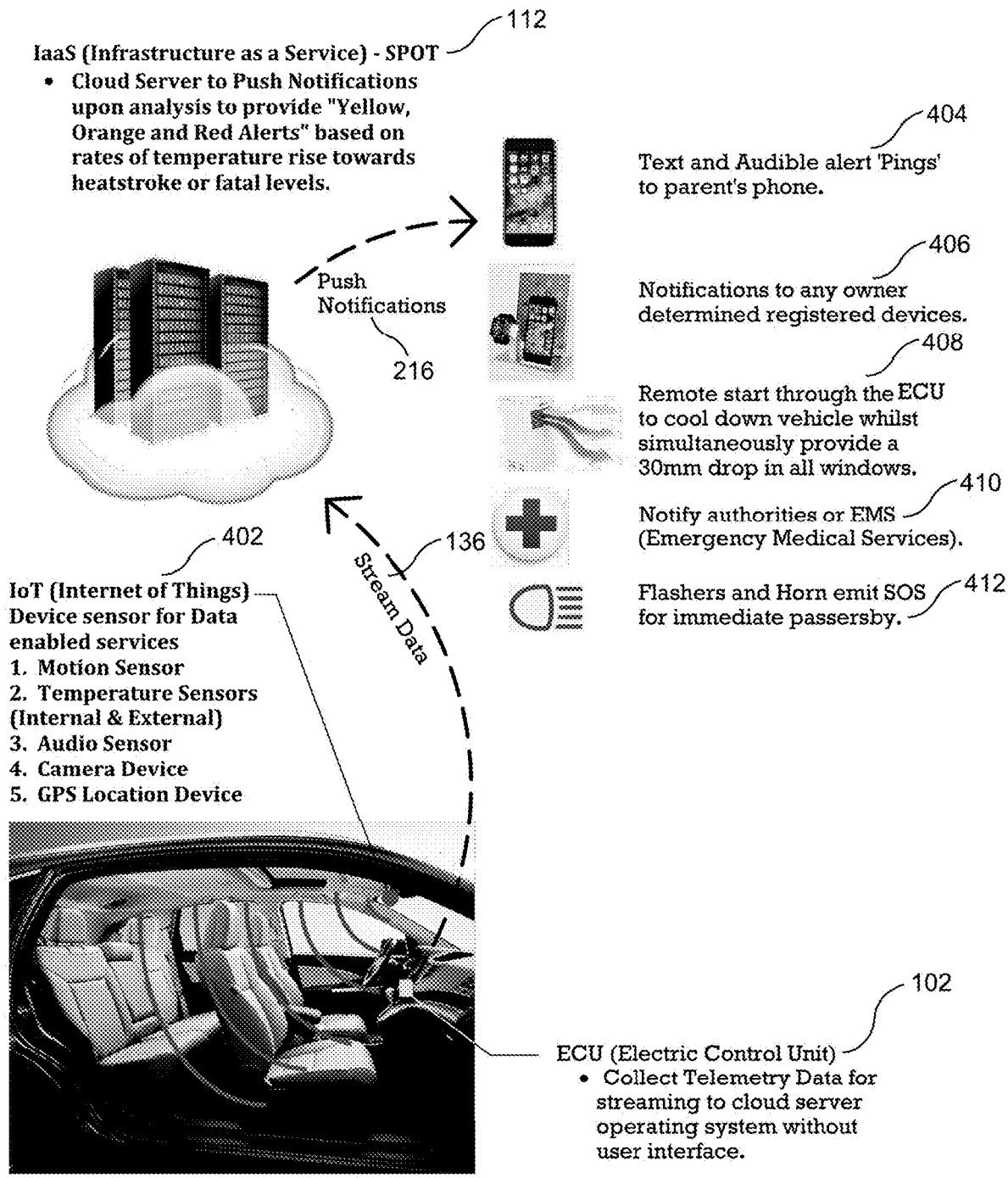
FIG. 4 shows a graphic representation of the overall components in the working system.

FIG. 4 graphically shows the overall invention in general terms. Sensors at the rearview mirror scans the vehicle for occupancy and elevating temperatures. This information is locally processed by the ECU and streamed to the SPOT cloud server from which various actions or push notifications can occur to address any overheating concerns.

Figure 5:
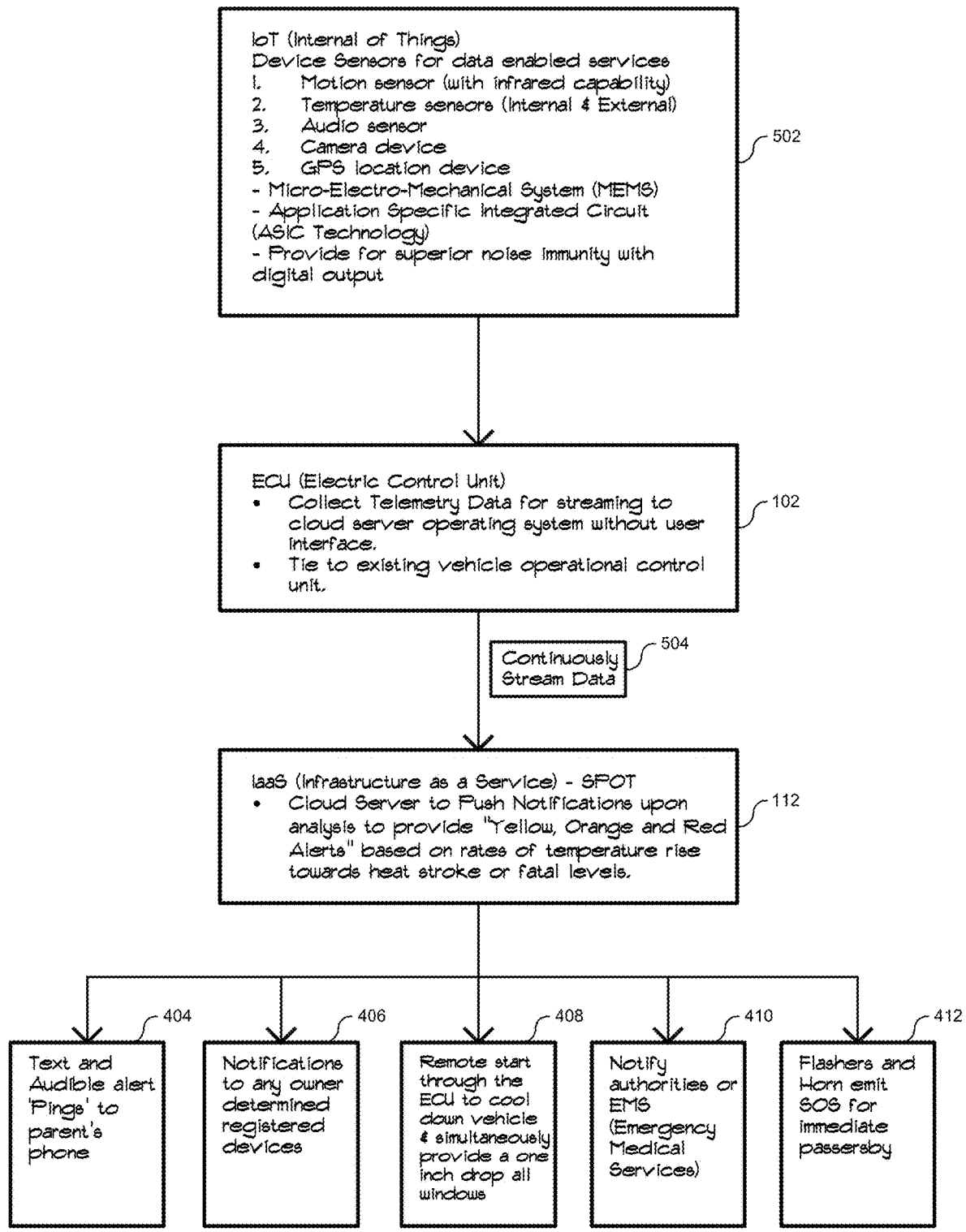
FIG. 5 illustrates a block diagram with component determinants.

FIG. 5 provides another view of how the data is streamed from sensors to final push notifications, with some specificity for the required components. Sensors with actuators, especially such as the temperature, motion and audio sensors would have to be built upon a Micro-Structure platform scale since the real estate for electronics within the actual vehicle prime location remains limited. Sensors mentioned (technically categorized as transducers) will be receiving mechanical signals and converting to electrical signals to send to the Ingestor. MEMS (micro-electro-mechanical systems) technology can be employed on any transducer elements. This aspect of MEMS using integrated microelectronics can be used for further interface with the vehicle's own power stream along with the existing electronic systems. Using ASIC (application-specific integrated circuit with algorithms to predict the temperature variances movement) vs. standard logic integrated circuit helps deliver data regarding very minute fluctuations in temperatures internally, in instances where the outside ambient T is above 29° C. (85° F.), the vehicle interior temp would spike more rapidly. Any gains in generating timely notifications provide for better safeguards in user's response time.

Narrative of SPOT

The proposed invention—SPOT, functions as a safeguard against vehicular heat-related deaths or injuries as well as theft in vehicles. Once the vehicle engine is turned off, and driver vacates his seat, the sensors are activated and begin to stream data.

SPOT works with a combination of hardware and software components. The software includes coding and algorithms that interacts with cloud servers and various Internet of Things (IoT) devices, while the hardware involves sensors and an Electronic Control Unit (ECU). These are expressed via a vehicle App placed on the existing vehicle's command display screen or infotainment center showing system functionality without override capability. The sensor combination detects a variety of factors or data points, and, upon analysis, prompts certain actions to be executed.

One of these factors is motion, or more specifically the sudden increase of emitted infrared energy. If a sudden increase of emitted infrared energy increases past a preset threshold C, and network connectivity is available, then push notification services will take place from the SPOT Cloud Service (see FIG. 2). If there is no network connection, then locally at the ECU Command Module preventative measures will be taken (see FIG. 1).

Another one of these factors is the ambient interior temperature of the vehicle. Should the ambient interior temperature cross a preset threshold A and motion is detected inside the vehicle, SPOT will send push notification 'Yellow' warning to registered IoT devices. From the registered IoT devices, specific selective preventative measures can be activated (see FIG. 2). Should the ambient interior temperature continue to increase pass preset threshold B and motion is still detected inside the vehicle, SPOT will send push notification 'Orange' warning to registered IoT devices as well as Emergency Medical Services (EMS) with GPS location. Should the ambient interior temperature continue to increase past threshold C and motion is still detected inside the vehicle, SPOT will send push notification 'Red' warning to registered IoT devices, Emergency Medical Services (EMS) with GPS location, and the Command Module will activate all preventative measures. Exterior Ambient temperature also plays a role, such that exterior vehicle temperature directly relates to the frequency or severity of alerts as well as when full preventative measures are to be taken and EMS will be notified.

An additional factor that can be detected is sound waves. An aspect of a sensor which can differentiate between normal voice frequencies (VF) and more uncommon VFs can be used in combination with the aforementioned sensors to activate preventative measures and send notifications. A visual recorder will also be a part of the apparatus, so owners of registered IoT devices can remotely view the inside of the car when needed. Vehicle alarm systems are typically based on intrusion force, triggering a short circuit and a resulting audible and flashing lights alarm. However, by integrating the video recorder with the interior sensors when an unwanted intruder is detected this information is recorded and images can be used by law enforcement. Users (strictly owner control) can quickly and remotely take a visual scan of the interiors of their vehicle at their discretion.

A combination of all these data points can also be implemented as an anti-theft function. Even if the interior ambient temperature of the car has not gone past thresholds A, B, or C, and suddenly motion is detected inside the vehicle, owners of registered IoT devices can view the interior of their vehicle to determine if a pet or known human is inside (in this case, and if the threshold B has not been crossed, then selective preventative measures option can be activated) or an unknown human is in the vehicle (in this case, the proper authorities can be notified).

Having thus described the different embodiments of a system and method, it should be apparent to those skilled in the art that certain advantages of the described method and apparatus have been achieved.

What is claimed is:

1. A cloud service for monitoring conditions in a vehicle, comprising:
   a gateway receiving data from ECUs (electronic control units) of multiple vehicles that have their engines shut off and their drivers out of the car, with the vehicles unattended by the drivers, wherein the data includes internal vehicle temperature and presence of a passenger in the vehicle detected using a thermal sensor that detects a difference between a moving object temperature and vehicle upholstery temperature, wherein the thermal sensor is activated when the driver leaves the vehicle;

a data ingestor that filters the data and performs anomaly detection;
a stream analyzer that analyzes trends of the data after the data ingestor to determine if the data falls within valid data ranges;
a data repository that stores the data; and
a notification component that interfaces to users and provides notifications in response to the determination by the stream analyzer that a valid event has occurred in at least one of the vehicles,
wherein, if the internal vehicle temperature is above a predefined threshold and the presence of the passenger is detected, an engine of that vehicle is turned on by the ECU and an air conditioner is activated until temperature inside the vehicle reaches a predetermined value, and
wherein, if the internal vehicle temperature is outside predetermined parameters or changes faster than a predetermined rate, such data is rejected as anomalous.

2. The system of claim 1, wherein the notifications are push notifications.

3. The system of claim 1, wherein the notifications include EMS (emergency medical services) notifications.

4. The system of claim 1, wherein the anomaly detection also includes detection of temperatures below a predetermined threshold.

5. The system of claim 1, wherein the data includes GPS data.

6. The system of claim 1, wherein the data includes audio data from a sensor calibrated to detect human voice.

7. The system of claim 1, wherein the data includes camera data received from a camera mounted on a rear-view mirror, and wherein the cloud service provides a video feed from the camera to a remote Internet of Things device.

8. A method for monitoring conditions in a vehicle, the method comprising:
at a cloud service, receiving data from ECUs (electronic control units) of multiple vehicles that have their engines shut off and their drivers out of the car, with the vehicles unattended by the drivers, wherein the data includes internal vehicle temperature and presence of a passenger in the vehicle detected using a thermal sensor that detects a difference between a moving object temperature and vehicle upholstery temperature, wherein the thermal sensor is activated when the driver leaves the vehicle;
filtering the data and performing anomaly detection;
analyzing trends of the data after the filtering to determine if the data falls within valid data ranges;
storing the data after the analyzing step; and
interfacing to users and providing notifications in response to the determination that a valid event has occurred in at least one of the vehicles,
wherein, if the internal vehicle temperature is above a predefined threshold and the presence of the passenger is detected, an engine of that vehicle is turned on by the ECU and a horn is sounded, and
wherein, if the internal vehicle temperature is outside predetermined parameters or changes faster than a predetermined rate, such data is rejected as anomalous.

9. The method of claim 8, wherein the notifications are push notifications.

10. The method of claim 8, wherein the notifications include EMS (emergency medical services) notifications.

11. The method of claim 8, wherein the anomaly detection also includes detection of temperatures below a predetermined threshold.

12. The method of claim 8, wherein the data includes GPS data.

13. The method of claim 8, wherein the data includes audio data from a sensor calibrated to detect human voice.

14. The method of claim 8, wherein the data includes camera data received from a camera mounted on a rear-view mirror, and wherein the cloud service provides a video feed from the camera to a remote Internet of Things device.

* * * * *